(12) United States Patent
Lor

(10) Patent No.: US 11,306,471 B2
(45) Date of Patent: Apr. 19, 2022

(54) SYSTEMS, METHODS, AND DEVICES RELATING TO A URINAL

(71) Applicant: Walor, Inc., Fresno, CA (US)

(72) Inventor: Eddie Lor, Riverside, CA (US)

( * ) Notice: Subject to any disclaimer, the term of this patent is extended or adjusted under 35 U.S.C. 154(b) by 0 days.

(21) Appl. No.: 16/118,822

(22) Filed: Aug. 31, 2018

(65) Prior Publication Data

US 2018/0371736 A1 Dec. 27, 2018

Related U.S. Application Data

(62) Division of application No. 15/260,547, filed on Sep. 9, 2016, now Pat. No. 10,179,988.

(Continued)

(51) Int. Cl.
*E03D 13/00* (2006.01)
*E03D 5/10* (2006.01)
(Continued)

(52) U.S. Cl.
CPC ............ *E03D 13/00* (2013.01); *E03C 1/01* (2013.01); *E03D 1/003* (2013.01); *E03D 5/105* (2013.01); *E03D 13/005* (2013.01); *H04W 4/80* (2018.02); *H04W 76/14* (2018.02); *H04W 84/18* (2013.01); *E03D 13/002* (2013.01); *G05B 2219/37426* (2013.01)

(58) Field of Classification Search
CPC ......... E03D 13/00; E03D 1/003; E03D 5/105; E03D 13/002; H04W 4/80; E03C 1/01
See application file for complete search history.

(56) References Cited

U.S. PATENT DOCUMENTS

| 3,500,480 A | 3/1970 | Michal, Jr. |
| 3,742,522 A | 7/1973 | Stevenson |

(Continued)

FOREIGN PATENT DOCUMENTS

| CA | 2673008 | 12/2010 |
| CN | 201127560 | 10/2008 |

(Continued)

OTHER PUBLICATIONS

A Guide to Better Public Toilet Design and Maintenance, Third Edition, by the Restroom Association of Singapore, Zhi Tong (May 6, 2014).

(Continued)

*Primary Examiner* — Michael A Keller
(74) *Attorney, Agent, or Firm* — Law Offices of Jon E. Kappes, PLC

(57) ABSTRACT

Systems, methods, and devices relating to urinal, in some examples having a movable portion able to pivot from a generally closed to a generally open position. The urinal may have a drain line engaged with a proximal end of the funnel for conveying urine and rinse water into a sewer line or a toilet bowl and a rinse line coupled with a water supply for rinsing urine therein. The urinal may be movable with the assistance of one or more sensors that may automatically signal other electrical or mechanical components to move one or more portions of the urinal, and may be include elements that seal portions of the urinal when not in use or during cleaning to reduce gas or liquid escaping from the urinal system.

7 Claims, 12 Drawing Sheets

Related U.S. Application Data

(60) Provisional application No. 62/217,861, filed on Sep. 12, 2015.

(51) Int. Cl.
   | | |
   |---|---|
   | *H04W 4/80* | (2018.01) |
   | *E03C 1/01* | (2006.01) |
   | *E03D 1/00* | (2006.01) |
   | *H04W 76/14* | (2018.01) |
   | *H04W 84/18* | (2009.01) |

(56) References Cited

U.S. PATENT DOCUMENTS

| | | |
|---|---|---|
| 3,822,419 A | 7/1974 | Wilson |
| 4,137,579 A | 2/1979 | Soler |
| 4,549,321 A | 10/1985 | Douillard |
| 4,982,455 A | 1/1991 | Carter |
| 5,134,728 A * | 8/1992 | Sturm ............... E03D 11/12 4/307 |
| 5,153,947 A | 10/1992 | Markles |
| 5,276,925 A | 1/1994 | Blaha |
| 5,299,328 A | 4/1994 | Walega |
| 5,390,374 A | 2/1995 | Hubrig et al. |
| 5,655,230 A | 8/1997 | Corbin |
| 5,737,779 A | 4/1998 | Haddock |
| 5,799,340 A | 9/1998 | Hubrig et al. |
| 5,819,331 A | 10/1998 | Miuccio |
| 6,079,057 A | 6/2000 | Mette |
| 6,206,340 B1 * | 3/2001 | Paese ............... E03C 1/057 251/129.04 |
| 6,305,034 B1 | 10/2001 | Perez Urrutia |
| 6,408,449 B1 | 6/2002 | Aguirre |
| 6,496,989 B1 | 12/2002 | Meiser |
| 6,546,566 B1 | 4/2003 | Geisel |
| 6,668,388 B2 | 12/2003 | Buttigieg |
| 6,978,491 B1 | 12/2005 | Miller |
| 7,228,572 B1 | 6/2007 | Holden |
| 7,331,068 B1 | 2/2008 | Tichenor |
| 7,496,974 B1 | 3/2009 | Kang |
| 8,001,625 B2 | 8/2011 | Tillman |
| 8,032,955 B1 | 10/2011 | Emerson |
| 8,166,579 B2 | 5/2012 | Mehta |
| 8,181,283 B2 | 5/2012 | Burch |
| 8,424,125 B2 | 4/2013 | Anderson |
| 2008/0189850 A1 * | 8/2008 | Seggio ............... E03C 1/05 4/623 |
| 2010/0000373 A1 | 2/2010 | Hanson et al. |
| 2010/0199413 A1 * | 8/2010 | Pollack ............... E03D 9/052 4/213 |
| 2012/0246816 A1 | 10/2012 | Jung |
| 2013/0185866 A1 * | 7/2013 | Cheung ............... E04H 1/1216 4/662 |
| 2014/0047631 A1 * | 2/2014 | Seibt ............... E03F 1/006 4/341 |
| 2014/0117265 A1 * | 5/2014 | Cochart ............... H01M 2/1016 251/129.15 |
| 2016/0060856 A1 * | 3/2016 | McIntyre ............... E03D 13/00 4/311 |
| 2017/0004287 A1 * | 1/2017 | O'Toole ............... G06F 19/3481 |

FOREIGN PATENT DOCUMENTS

| | | |
|---|---|---|
| CN | 203320672 | 12/2013 |
| CN | 104278728 | 1/2015 |
| DE | 3742760 | 8/1988 |
| EP | 1730363 | 12/2006 |
| GB | 2368519 | 5/2002 |
| WO | WO2011098620 | 8/2011 |

OTHER PUBLICATIONS

A Guide to the Urinal, Sam Mac, et al. (Dec. 31, 2005).
Floor Waste Outlet, Free-Standing Cabinet with Bed Pan Washer, Pivoting Toilet, Rectangular Lavatory, Anonymous (Oct. 6, 2015).
Folding Installable Home Urinal Provides Class, Jason Chen (Oct. 3, 2007).
Main Drain Adds a Clip-On, Adjustable Urinal to Your Toilet, Anonymous (Feb. 2, 2015).
Preliminary Third Party Search Report, Anonymous (Jan. 21, 2016).
Smart Nest Thermostat: A Smart Spy in Your Home, Security in Silicon Laboratory, University of Central Florida, Grant Hernandez, et al. (Jul. 3, 2014).
Ultimate Clean Toilet with Two Systems for Public Toilet, Anonymous (Sep. 2, 2009).

* cited by examiner

| Toilet ID 272 | Date/Time 274 | User ID 276 | Action 278 | Inlet Sensor 280 | Drain Sensor 282 | Error Codes 284 |
|---|---|---|---|---|---|---|

US 11,306,471 B2

SYSTEMS, METHODS, AND DEVICES RELATING TO A URINAL

CROSS REFERENCE TO RELATED APPLICATIONS

This case is a division of U.S. application Ser. No. 15/260,547, which itself claims priority to U.S. Provisional Appl. No. 62/217,861, which are incorporated by reference herein in their entirety.

FIELD OF THE INVENTIONS

The inventions described herein generally pertain to the field of urinals, or toilets more generally, and to the manner of making and using the same or components thereof.

INTRODUCTION

So as to reduce the complexity and length of this specification, the materials identified the following paragraphs in this section are herein expressly incorporated by reference in their entirety. The incorporated material is believed to be non-essential in accordance with 37 CFR 1.57 because it is referred to for purposes of providing general support, background, or information relating to the inventions. However, if any such material is deemed essential under Rule 1.57, any such text will be expressly added herein pursuant by the applicable rules.

U.S. Pat. No. 8,181,283 may generally concern a low flow urinal that includes a bowl which incorporates a plurality of spray nozzles communicated by an inlet flow line.

U.S. Pat. No. 8,032,955 may generally concern an oval-shaped module that is flat on the top and about three inches thick and is located between a toilet seat and a toilet bowl when it is not being used.

U.S. Pat. No. 7,496,974 may generally concern a urinal adapted to be connected to a flush toilet system, includes a bowl, a top opening, a bottom opening, a bottom drain opening, an extendable urinal, a connecting device and a seat that is provided on the top opening so that a female user can sit on the seat.

U.S. Pat. No. 7,331,068 may generally concern a wall mountable urinal having an ultra-low use of flush water, minimum material and a self-cleaning action.

U.S. Pat. No. 7,228,572 may generally concern a drained urinal that comprises an inverted truncated cone, a pivot arm connected beneath the truncated cone, and a base.

U.S. Pat. No. 5,276,925 may generally concern a retractable urinal for a toilet seat.

U.S. Pat. No. 5,299,328 may generally concern a water closet with a retractable urinal.

U.S. Pat. No. 6,668,388 may generally concern a retractable and disposable urinal.

U.S. Pat. No. 6,978,491 may generally concern an inflatable urinal for attachment to a toilet.

U.S. Pat. No. 6,305,034 may generally concern an extensible and retractable urine deflecting apparatus for use with a toilet.

U.S. Pat. No. 4,549,321 may generally concern a urinal mounted on a toilet seat.

U.S. Pat. No. 5,153,947 may generally concern a urinal for attachment to a toilet.

U.S. Pat. No. 3,500,480 may generally concern a urinal attachment for a toilet bowl.

U.S. Pat. No. 3,742,522 may generally concern a urinal structure including a movable receptacle.

European Patent Appl. No. EP 1730363 may generally concern a retractable urinal.

Canadian Patent Appl. No. CA 2673008 may generally concern a retractable urinal.

Chinese Patent No. CN 2011275560 may generally concern an environmentally-friendly telescopic travel urinal.

Chinese Appl. No. CN 104278728 may generally concern an anti-leakage male urinal outer cover capable of stretching and retracting automatically.

Chinese Patent No. CN 203320672 may generally concern a drip-proof automatic telescopic outer cover for a male urinal.

German Patent Appl. No. DE 3742760 may generally concern a water closet with a urinal.

The document titled "Smart Nest Thermostat: A Smart Spy in Your Home," by Grant Hernandez, et al., Security in Silicon Laboratory, University of Central Florida (2014).

The document titled "A Guide to Better Public Toilet Design and Maintenance," Third Edition, by the Restroom Association of Singapore (2013).

The document titled "A Guide to the Urinal," by Sam Mac and Chris Llennarg (last accessed August, 2016).

Unless specifically noted, words and phrases in this specification and the claims are to be given their plain and ordinary meaning. Thus, except where this specification uses the exact phrase "[word or phrase] is hereby defined to mean [definition]," the inventor expressly elects, as his own lexicographers, to use the plain and ordinary meaning of terms in the specification and claims rather than a special definition. Absent such specific statement to apply a special definition, the plain and ordinary meaning applies to the terms used in the specification and claims.

The inventor is also aware of the normal precepts of English grammar. Thus, if a noun, term, or phrase is intended to be characterized, specified, limited, broadened, modified or narrowed in some way, then such noun, term, or phrase will expressly include any desired or intended adjectives, descriptive terms, or other modifiers in accordance with the normal precepts of English grammar. Absent the use of such adjectives, descriptive terms, or modifiers, it is intended that such nouns, terms, or phrases be given their plain, and ordinary English meaning to those skilled in the applicable arts as set forth above.

Further, the inventor is aware of the availability and limits of functional claiming under 35 U.S.C. § 112(f). As used herein or in the claims, the words "function," "means" or "step" do not indicate an intent to invoke the special provisions 35 U.S.C. § 112(f) to define the inventions. To the contrary, if the provisions of 35 U.S.C. § 112(f) are sought to be invoked to define the inventions, the claims will specifically and expressly recite the exact phrase "means for" and will also expressly recite the word "function" followed by a description of the function (i.e., will state: "means for performing the function of [insert function]"), without also reciting in such phrases any structure, material or act in support of the function. Thus, even if a claim recites a "means for performing the function of . . . " if a claim also recites any supporting structure, material or acts then it is the clear intention of the inventor not to invoke the provisions of 35 U.S.C. § 112(f). If the provisions of 35 U.S.C. § 112(f) are invoked to define the claimed inventions (using the technique defined above), it is intended that the inventions not be limited only to the specific structure, material or acts that are described in any some embodiment, but in addition, include any equivalent structures, materials, or acts that perform the claimed function, or any structures, materials, or acts described in any alternative situations or forms of the inventions, or that are within the appropriate limits of claim scope and construction and that are reasonably described and reasonably enabled by this specification.

The inventions described in this specification and recited in the claims are not directed to laws of nature, natural phenomena, or abstract ideas, but instead, are directed to one or more of the expressly permitted statutory categories of inventions, i.e., processes, machines, manufactures, or compositions of matter. Nor are the inventions claimed herein directed to any prohibited examples of abstract ideas such as fundamental economic practices, methods of organizing human activity, an idea itself, or any mathematical relationships/formulas. To be clear, the claimed inventions are directed to significantly more than any abstract idea by itself.

Numerous possible or potential aspects, objects, modifications, features, uses, or advantages of various inventions described herein will be apparent to those of ordinary skill in the art from this specification, drawings, and claims. However, without characterizing or limiting the scope of the various inventions as they are claimed, some of the possible or potential aspects, objects, features, uses, or advantages of various inventions are summarized below. None of the following possible or potential aspects, objects, features, uses, or advantages are a disavowal, disclaimer, characterization, or interpretation of any aspects of any of the claims. These possible or potential aspects, objects, features, uses, or advantages might apply to any or none of the claimed inventions.

It may be an object, goal or advantage of some of the inventions to have a urinal comprising a retractable funnel.

It may be an object, goal or advantage of some of the inventions to have a urinal which can be retrofitted into commercial bathrooms.

It may be an object, goal or advantage of some of the inventions to have a urinal which can be retrofitted into household or domestic bathrooms.

It may be an object, goal or advantage of some of the inventions to reduce smell or odor.

It may be an object, goal or advantage of some of the inventions to provide efficient flushing and/or cleaning operations.

It may be an object, goal or advantage of some of the inventions to have a urinal usable by males or by females or by both males and females.

It may be an object, goal or advantage of some of the inventions to have a urinal with drain lines extending into an existing toilet, a sink drain pipe, or other plumbing fixture or drain.

It may be an object, goal or advantage of some of the inventions to have a urinal that includes a bowl or funnel that can be concealed when not being used.

It may be an object, goal or advantage of some of the inventions to have a urinal that includes a rinse system to help rinse urine from various surfaces.

It may be an object, goal or advantage of some of the inventions to have a urinal that could be position to the right side of an existing toilet, or to the left side of an existing toilet, or to either the left or ride sides of an existing toilet.

It may be an object, goal or advantage of some of the inventions to have a urinal to accommodate different bathroom designs or space considerations.

It may be an object, goal or advantage of some of the inventions to have a urinal that may be manufactured by plastic materials, ceramic materials, composite material, metal materials, or by the use of multiple types of materials.

It may be an object, goal or advantage of some of the inventions to have a urinal that may be manufactured by an injection molding process or by a casting process, or by a machining process.

It may be an object, goal or advantage of some of the inventions to shape the urinal surfaces in a way to reduce or minimize splashes of urine.

It may be an object, goal or advantage of some of the inventions to have a portion of the urinal pivot from a concealed position to a use position.

It may be an object, goal or advantage of some of the inventions to have a portion of the urinal moveable by a manual process or moveable by an automatic process, for example, as by using one or more sensors, motors, springs, gears, pulls, actuators, and/or other electronic or mechanical devices.

It may be an object, goal or advantage of some of the inventions to utilize sensors such as photodiodes, infrared sensors including passive infrared sensors, motion sensors, or other types of sensors to detect when a user is present or not present.

It may be an object, goal or advantage of some of the inventions to have a changeable height to accommodate users of different heights, for example, children and adults.

It may be an object, goal or advantage of some of the inventions to be wall mounted or be floor mounted.

It may be an object, goal or advantage of some of the inventions to provide pivoting of different degrees, including for example, from zero degrees (closed) to ninety degrees (open at a right angle) to 180 degrees (inverted), or about 10, 20, 30, 40, 50, 60, 70, or 80 degrees.

It may be an object, goal or advantage of some of the inventions to have one or more inlet lines for coupling, directly or indirectly, to a clean water supply line to supply water to rinse portions of the urinal.

It may be an object, goal or advantage of some of the inventions to have one or more outlet lines for coupling, directly or indirectly, to an outlet such as a sewer line or pipe or to a nearby toilet.

It may be an object, goal or advantage of some of the inventions to have a seal around a moveable portion of the urinal to substantially seal liquids, solids, or gases from entering or existing the urinal while closed, with such seal being fabricated from a material such as rubber, plastic, neoprene, or combination of materials.

It may be an object, goal or advantage of some of the inventions to have urinals become a common feature of residential bathrooms.

It may be an object, goal or advantage of some of the inventions to have a wired or wireless network, e.g., WiFi interface or connection to the urinal, or to a urinal controller.

It may be an object, goal or advantage of some of the inventions to communicate with the urinal over a network in order to track use, maintenance, or performance information such as duty cycle, number of uses, amount of water used, frequency of opening or closing, current status, last serviced date/time, last use date/time, toilet or urinal ID, average time that urinal is in an open position when used, volume of output material, battery status, power status, location, manufactured date/time, model no., error messages or codes, troubleshooting information, among others.

It may be an object, goal or advantage of some of the inventions to join a home or business network and be accessible to owners, managers, or others via a smartphone interface, or via other devices on the home or business network.

It may be an object, goal or advantage of some of the inventions to offer reduced water or no water operation.

It may be an object, goal or advantage of some of the inventions to operate in a small area and keep urine from splashing onto the floor, thereby aiding in keeping bathrooms clean and odor free.

BRIEF DESCRIPTION OF THE DRAWINGS

Additional understanding of the inventions may be derived by referring to the description when considered in connection with the figures. In the figures, like reference numbers refer to like elements or acts. While the figures provide several examples of aspects, elements, modifications, or components that may or may not be variously involved with the systems, methods, and devices described herein, the figures are not provided to define, limit, or affect the scope of the inventions described herein, which are instead defined by the claims.

Elements and acts in the figures are illustrated for simplicity and have not necessarily been rendered according to any particular embodiment or example.

ADDITIONAL DETAILED DESCRIPTION

The inventions are explained in additional detail below.

Figure 9:
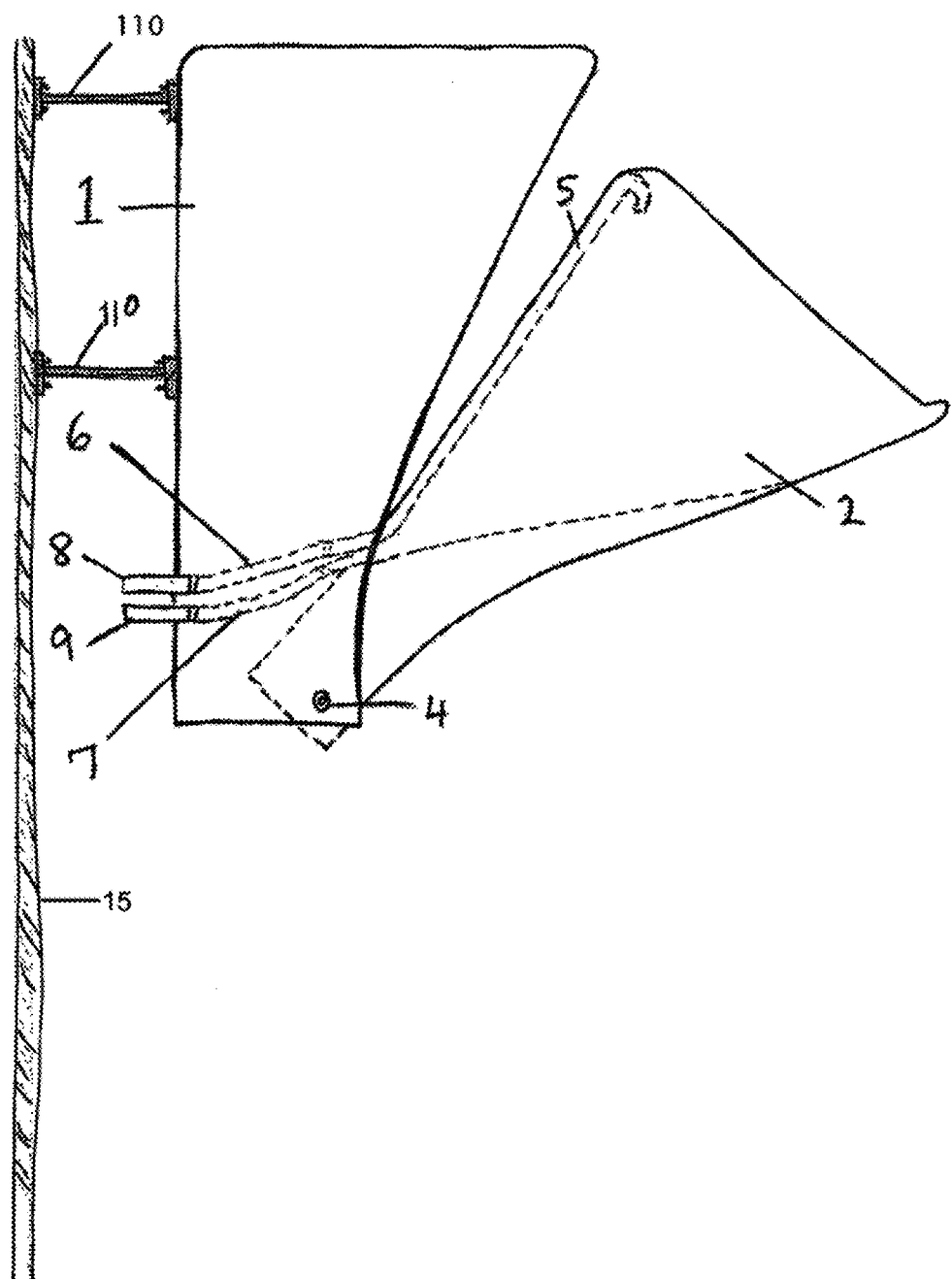
FIG. 9 is side view depicting an apparatus with phantom lines illustrating some internal components of an example urinal apparatus.

Referring, for example, to FIGS. 1 through 4, a urinal can include housing body 1 supported by support base 3. Body 1 may be integrally formed with base 3. The body may be fixedly engaged with a separate base or may be couple or mounted to a wall or other surface without the use of a base. In some situations, base 3 may be freestanding. In some situations, and as illustrated in FIG. 5, base 3 may be coupled to wall 15 with bracket 10. In some situations, and as illustrated in FIG. 9, a urinal can omit a base and can be mounted to wall 15 in an elevated position with brackets 110.

Referring to FIGS. 1 through 4, funnel 2 may be concealed in body 1 in a first position when the urinal has a first non-use state. Generally, funnel 2 is shaped to have a wide or larger portion or opening at the top and a smaller or narrower portion toward the bottom. The funnel may be symmetric or non-symmetric, and it have angled portions, convex or concave portions, and/or may be gently arced from top to bottom. Funnel 2 may be pivotally engaged with sidewalls of body 1 with hinge 4. Funnel 2 may rotate around hinge 4 between at least two positions (e.g., a first upright position when the urinal is not in use and a second extending position when the urinal is in use). In some situations, the first position of funnel 2 may be in a closed or concealed position whereby funnel 2 is positioned generally inside of housing 1.

When funnel 2 is in use, urine may collect in funnel 2 and drain down to an opening in the bottom of funnel 2. Drain line 7 may be coupled to funnel 2 at an opening of the funnel 2 and with connector 9 at the back of housing 1, and as shown in FIG. 5, drain line 12 may be coupled to connector 9. It is to be appreciated that drain line 7, connector 9, and drain line 12 may constitute a drain for conveying urine away from the funnel. The drain line may comprise a single line, or may comprise a plurality of portions for conveying urine away from the urinal.

The urinal may include water inlet line 5 for conveying rinse water into funnel 2 to rinse urine collected in funnel 2 during use. In some situations, inlet line 5 is integrally formed in funnel 2. Or, the inlet line may comprise a tube coupled to the funnel. Inlet line 6 may be coupled on a first end with water inlet line 5 and on a second end with connector 8 at the back of housing 1, and as shown in FIG. 5, inlet line 11 may be coupled to connector 8. The inlet line may comprise a single line, or may comprise a plurality of portions for conveying water to rinse the funnel.

In some situations, inlet line 6 and drain line 7 may comprise flexible tubing or pipe for bending as funnel 2 pivots, moves, or adjusts between different positions.

Figure 1:
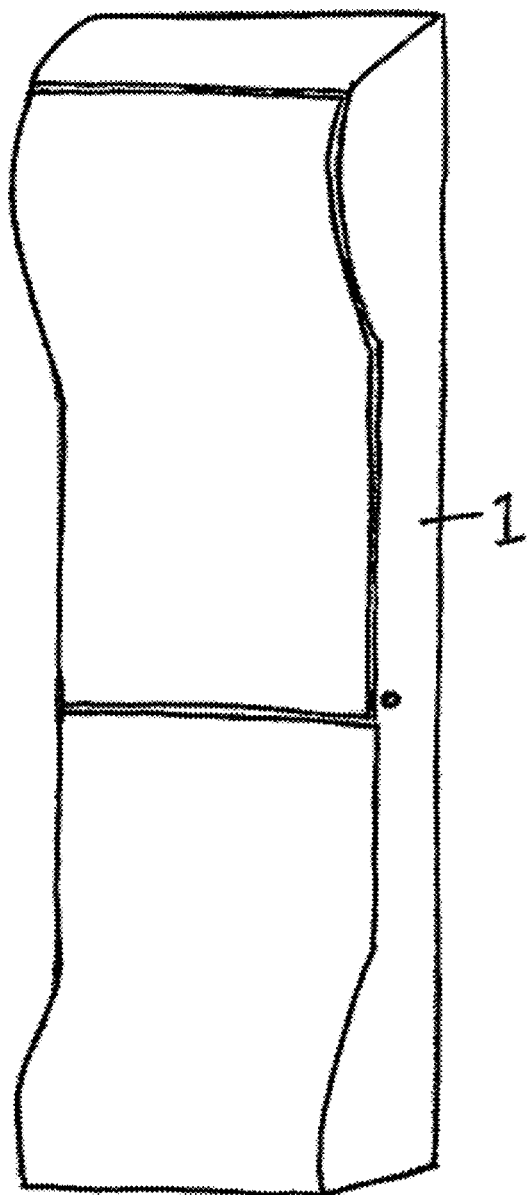
FIG. 1 is a front perspective view of an example urinal apparatus.
Figure 2:
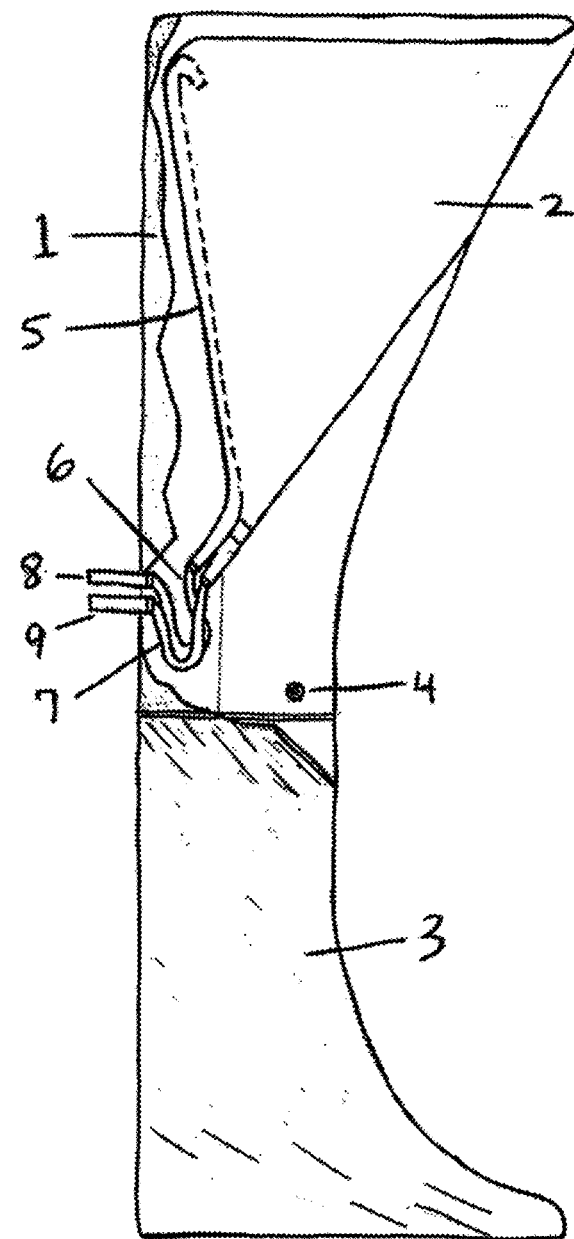
FIG. 2 is cross sectional side view of the apparatus of FIG. 1.
Figure 3:
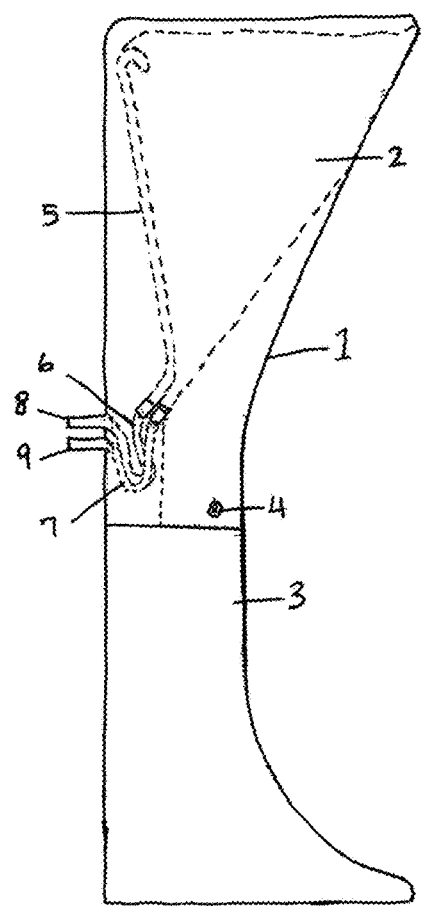
FIG. 3 is side view depicting an apparatus with phantom lines illustrating some internal components of an example urinal apparatus.
Figure 4:
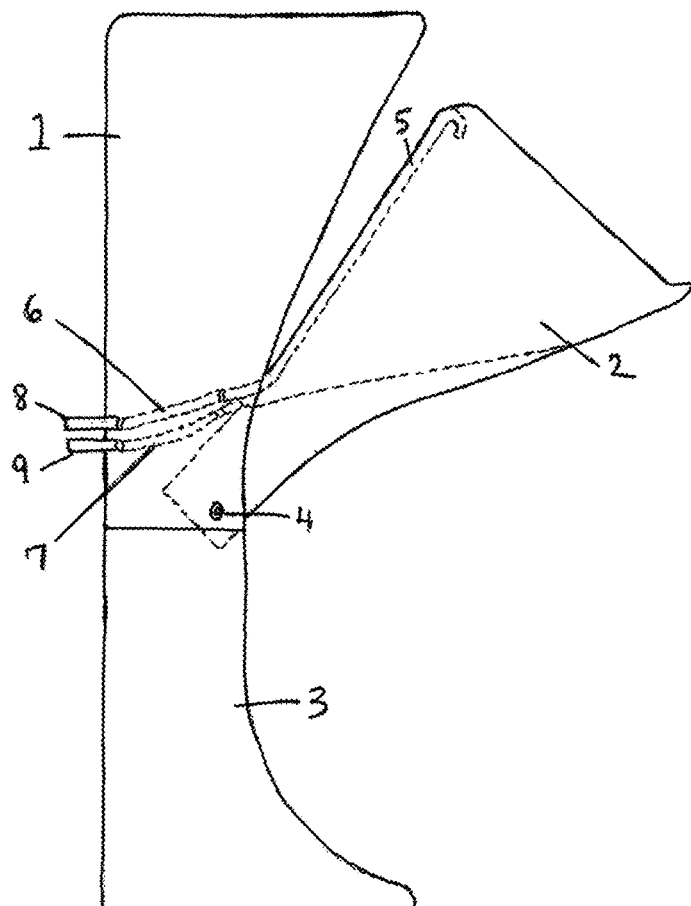
FIG. 4 is a side view depicting the apparatus of FIG. 3.
Figure 5:
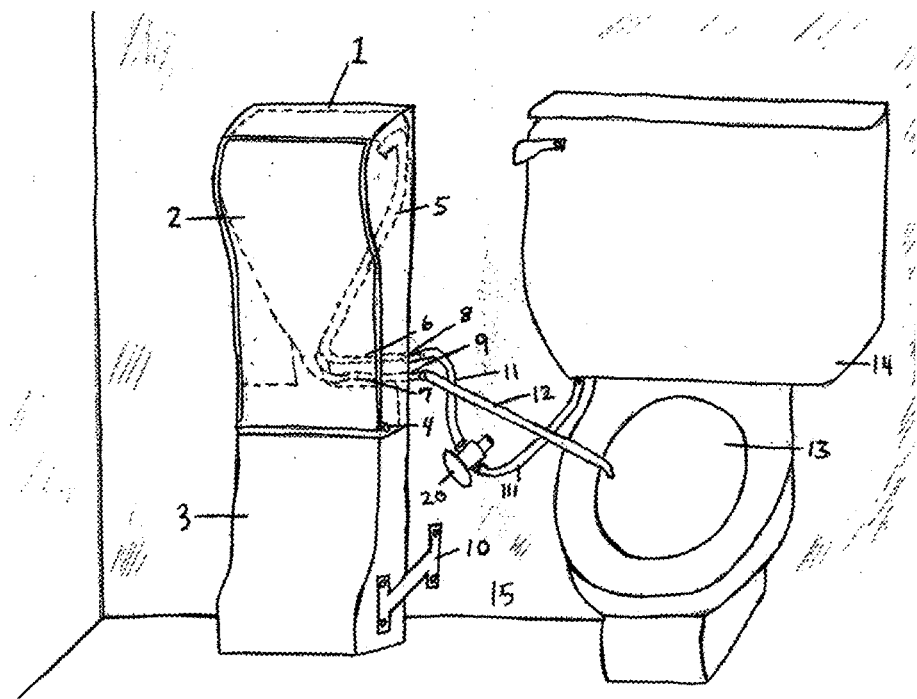
FIG. 5 is a drawing depicting a system involving an example urinal apparatus.

FIG. 4 illustrates a urinal having a second in-use state, where a distal end of funnel 2 extends out of housing 1 for receiving urine. In some situations, the funnel can be positioned manually by a foot lever or other mechanical or powered mechanism between its open in use position and closed non-use concealed position. An electric motor, stepper motor, or other powered actuator may be used to move the position of one or more portions of the urinal such as the funnel. A manual push clip or magnet may be used in some situations for opening and closing of the urinal.

Figure 6:
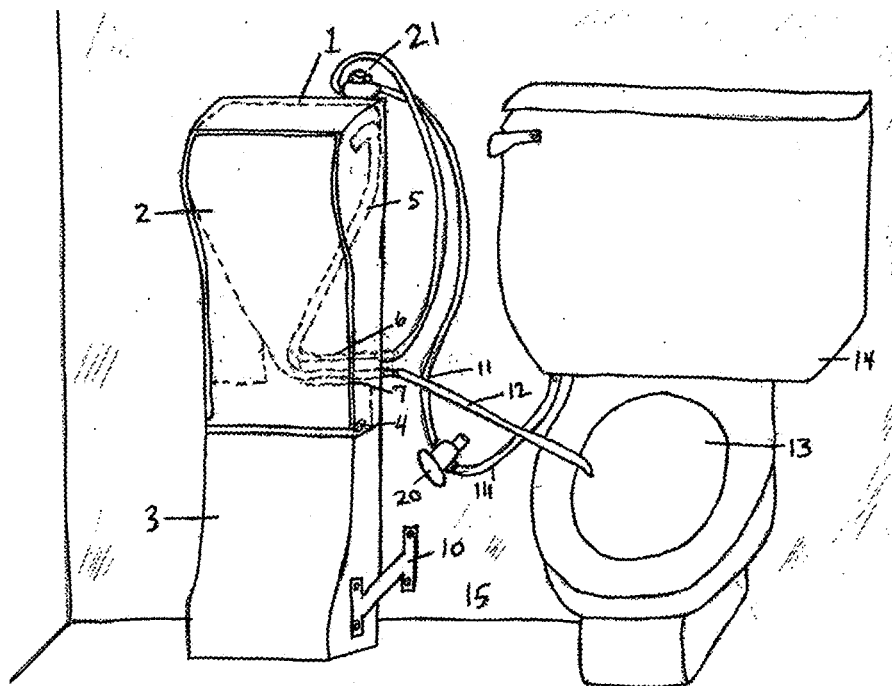
FIG. 6 is a drawing depicting a system involving an example urinal apparatus.

FIGS. 5 and 6 illustrate systems including urinals. The urinal may include housing 1, funnel 2, and base 3 where base 3 may be mounted to wall 15. The urinal may be positioned adjacent to toilet 13. inlet line 11 may be engaged with connector 8 on one end and water valve 20 on another end. Toilet inlet line 111 may be engaged with water valve 20 for receiving water in tank 14. In some situations, and referring to FIG. 6, push valve or trigger valve 21 may be provided in inlet line 11 between connector 8 and water valve 20, for permitting water to pass from water valve 20 through inlet lines 11, 6 and 5 so that urine can be rinsed from funnel 2.

In addition, or alternatively, inlet line 11 may have an inlet sensor 252 to detect the amount of water or liquid flowing through the line and may communicate that data to a controller 250 within the urinal to track the amount of water consumed, number of uses of the urinal, and/or number flushes. Urine and rinse water collected in funnel 2 may be conveyed through drain line 7 and 12. In some situations drain line 12 may be attached to connector 9 and have a distal end positioned in or near the bowl of toilet 13.

Waste from the urinal may be deposited into the bowl of toilet 13 for discharge into the sewer line. Drain line 12 may have a drain sensor 256 to detect the amount of liquid flowing through the drain line, and the sensor may communicate that data to a controller 250 within the urinal to track the amount of waste produced, number of uses of the urinal, and/or number of flushes. The amount of urine received may be calculated by subtracting the amount of water detected through the inlet line 11 from the amount of waste liquid detected through the drain line 12. Examples of flow sensors include volumetric flowmeters such as a positive displacement flowmeter, velocity flowmeters such as magnetic, turbine, ultrasonic, and vortex shedding flowmeters, mass flowmeters such as Coriolis mass and thermal flowmeters, inferential flowmeters such as differential pressure, target, and variable area flowmeters.

Examples of a controller for use in connection with the present urinals include, for example, a Texus Instruments (TI) Sitara AM3703 microprocessor (including for example a 32 channel DMA controller, a dual-output three-layer display processor, high speed USB controller, an emulation module, and SDRAM memory scheduler and controller, on-chip ROM with boot code, and on-chip SRAM, or a STMicroelectronics low power ARM Cortex-M3 microcontroller. Related or supporting electronic components may also be used including, for example, flash storage, RAM, driver circuits, temperature and humidity sensors, communications devices such as a UART, SDRAM, ECC NAND flash, and zigbee modules. Network connectivity may be provided by WiFi modules supporting 802.11 b/g/n/ac communications or other networking or communications protocols. Urinals may also include a power management module such as a TI TPS65921B. Administration of the urinal's electronics may be done via a wired or wireless connection such as WiFi or USB 3 interface. Power may be provided to the urinal or its electronics via batteries or via a power cord connected to home or building electricity, or a combination thereof.

Figure 7:
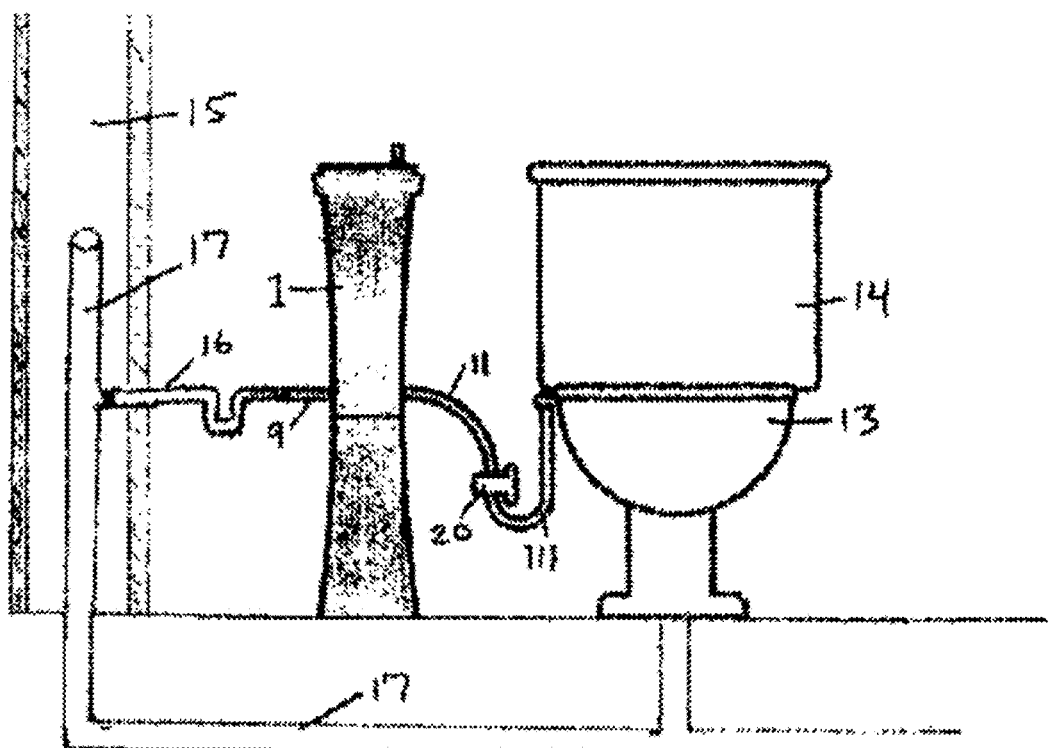
FIG. 7 is a drawing depicting a system involving an example urinal apparatus.
Figure 8:
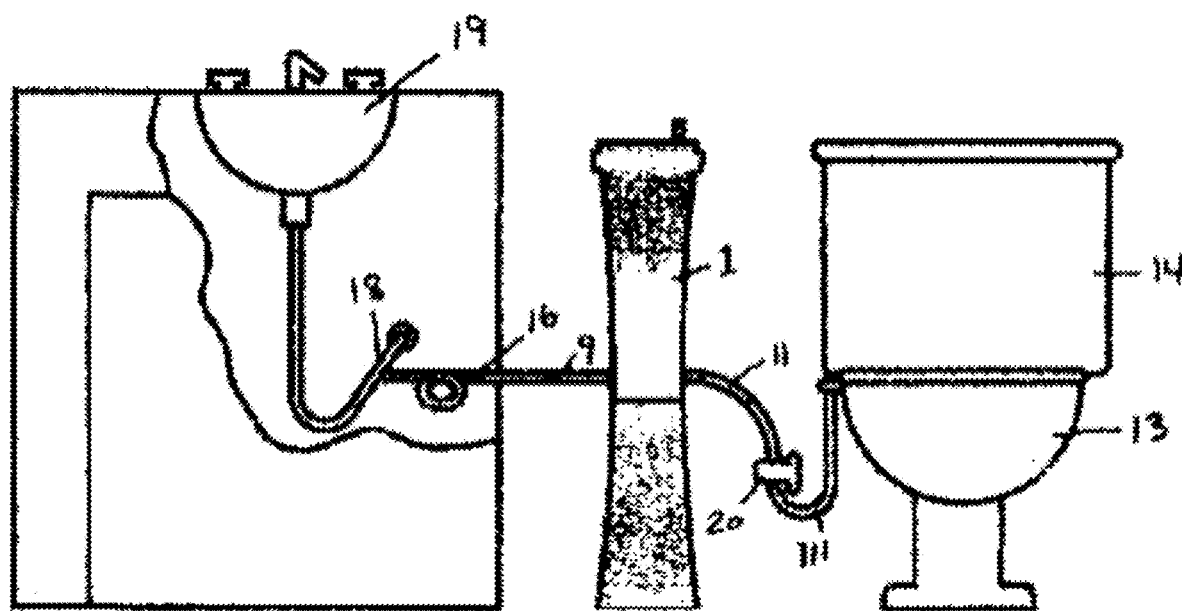
FIG. 8 is a drawing depicting a system involving an example urinal apparatus.

FIG. 7 illustrates another example of a system including a urinal. The system illustrated in FIG. 7 includes drain line 16 coupled on a first end to connector 9 and on a second end to sewer pipe 17. FIG. 8 illustrates another system including a urinal. Drain line 16 may be coupled on a first end to connector 9 and on a second end to drain pipe 18 associated with sink 19. As illustrated, waste water from sink 19 may flow into the sewer system through pipe 18 along with waste from the urinal. As illustrated in FIG. 7 urine can be conveyed from a funnel of the urinal into sewer pipe 17 and in the system illustrated in FIG. 8 urine can be conveyed from a funnel of the urinal into drain pipe 18. Thus, in some situations, it may not be necessary to have a drain line positioned near the bowl of a toilet for conveying urine and rinse water from the urinal into the bowl of the toilet.

FIG. 9 illustrates a urinal in which housing 1 is engaged with wall 15 by brackets 110. Such urinals can omit a base supporting housing 1.

Figure 10:
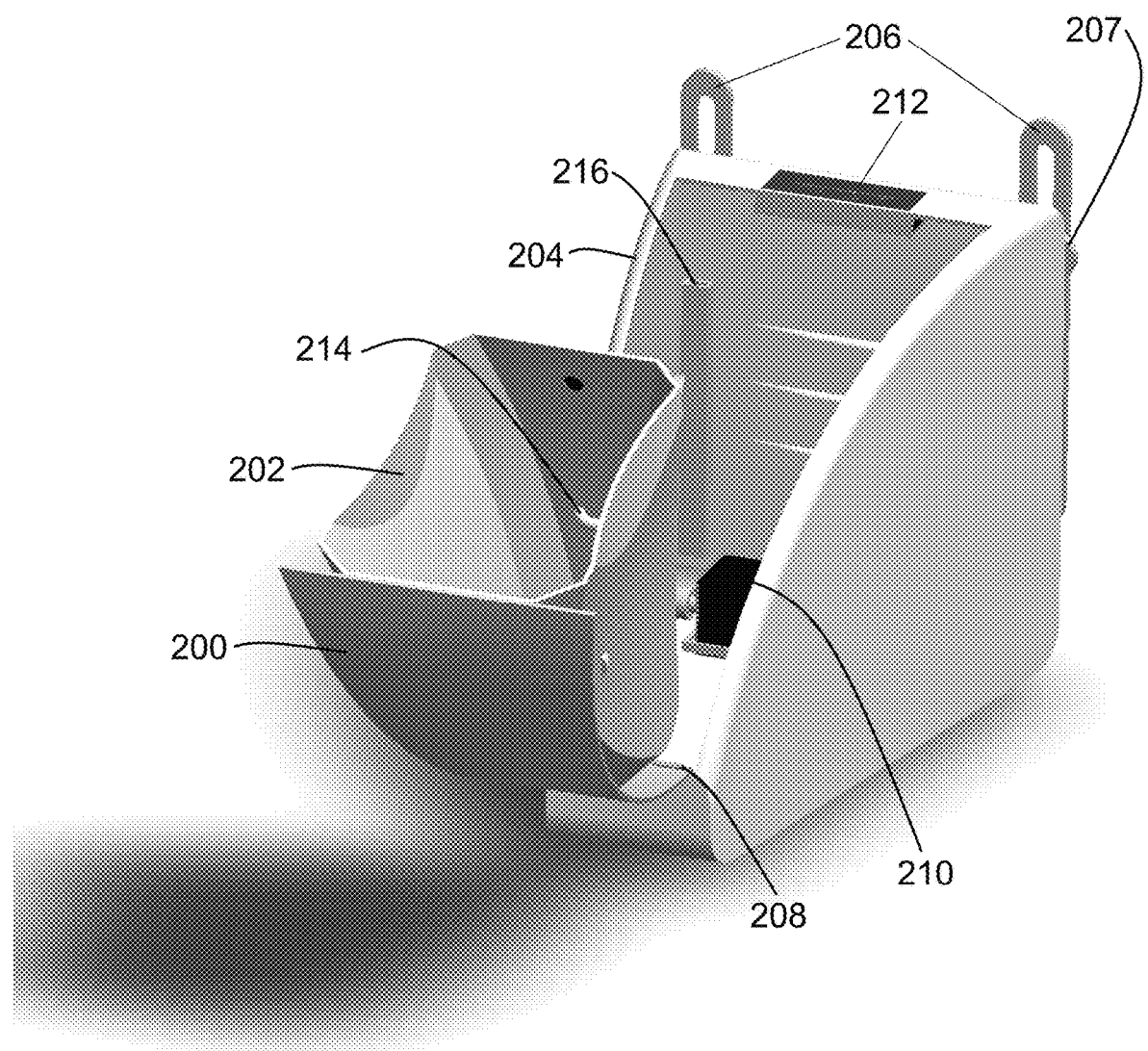
FIG. 10 is a three-dimensional rendering of an example urinal apparatus.
Figure 11:
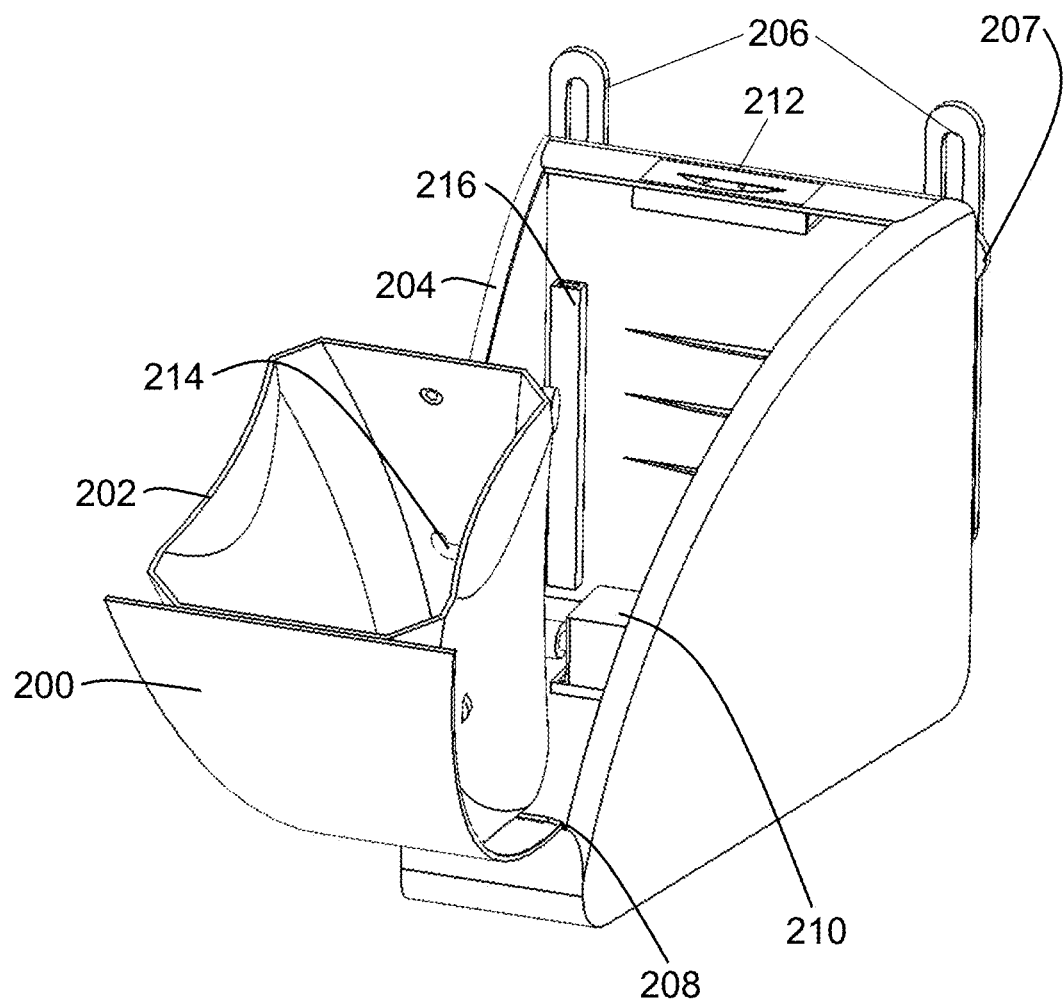
FIG. 11 is a three-dimensional drawing of an example urinal apparatus.

FIGS. 10 and 11 illustrate a three-dimensional rendering and a three-dimensional drawing, respectively, of an example urinal. Shown in FIGS. 10 and 11 is a cover 200, funnel 202, enclosure 204, brackets 206, mount 207, hinge 208, motor 210, sensors and controllers housing 212, rinser 214, and wire housing 216. As shown in these examples, the urinal body may be mounted with the use of one or more mounts 207 positioned generally horizontally and one or more brackets positioned generally vertically. The mounts and brackets may be motorized to adjust the position of the urinal in either or both of the horizontal and/or vertical directions.

Figure 12A:
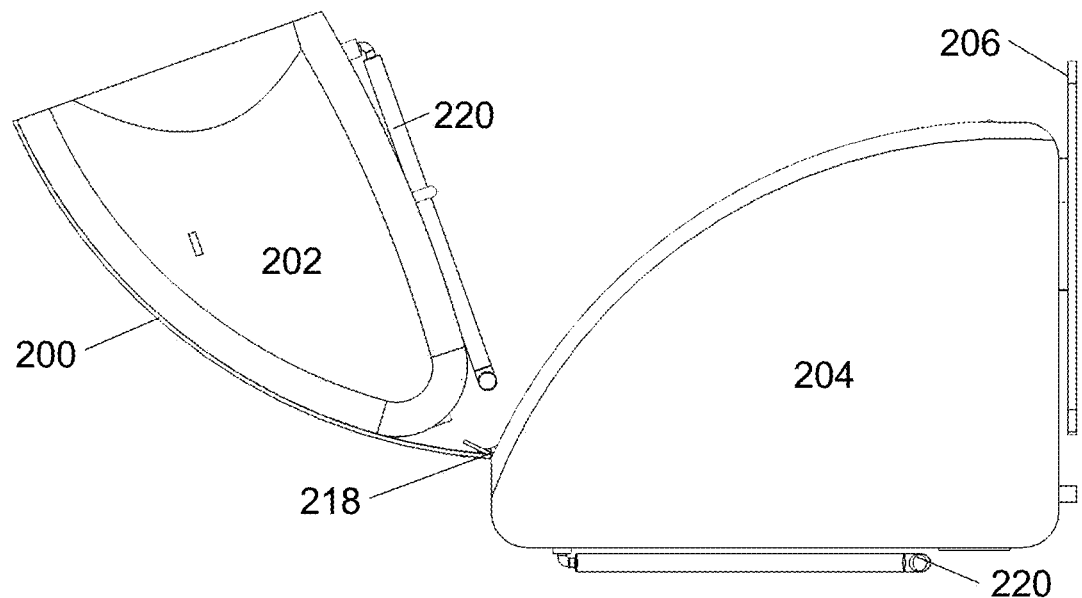
FIGS. 12A and 12B are drawings of two side views of an example urinal apparatus.
Figure 12B:
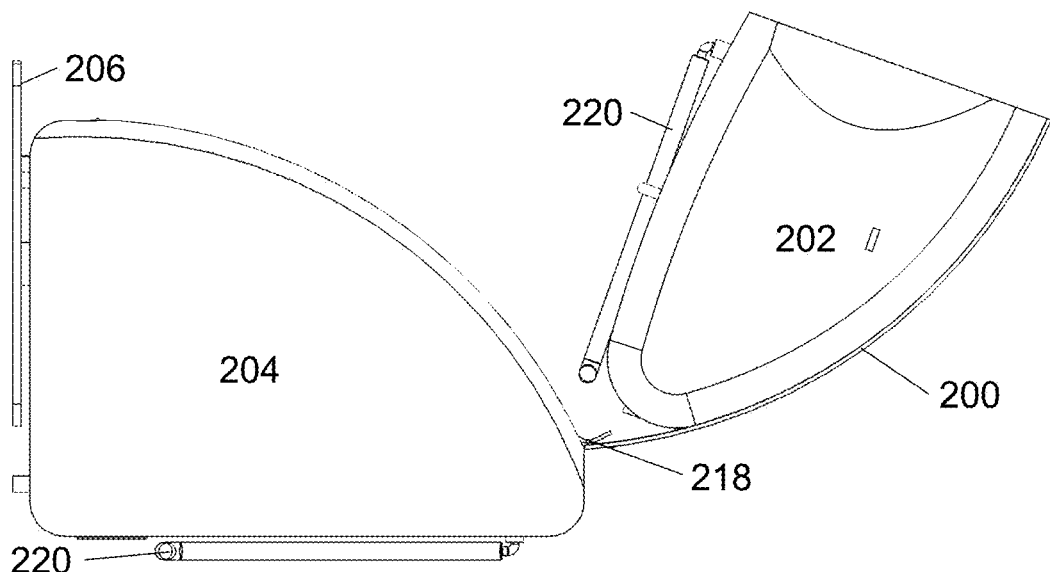

FIGS. 12A and 12B illustrate side view drawings of example urinals. Shown in FIGS. 12A and 12B are cover 200, funnel 202, enclosure 204, brackets 206, spring 218, rinse line 220, and drain line 222.

Figure 13A:
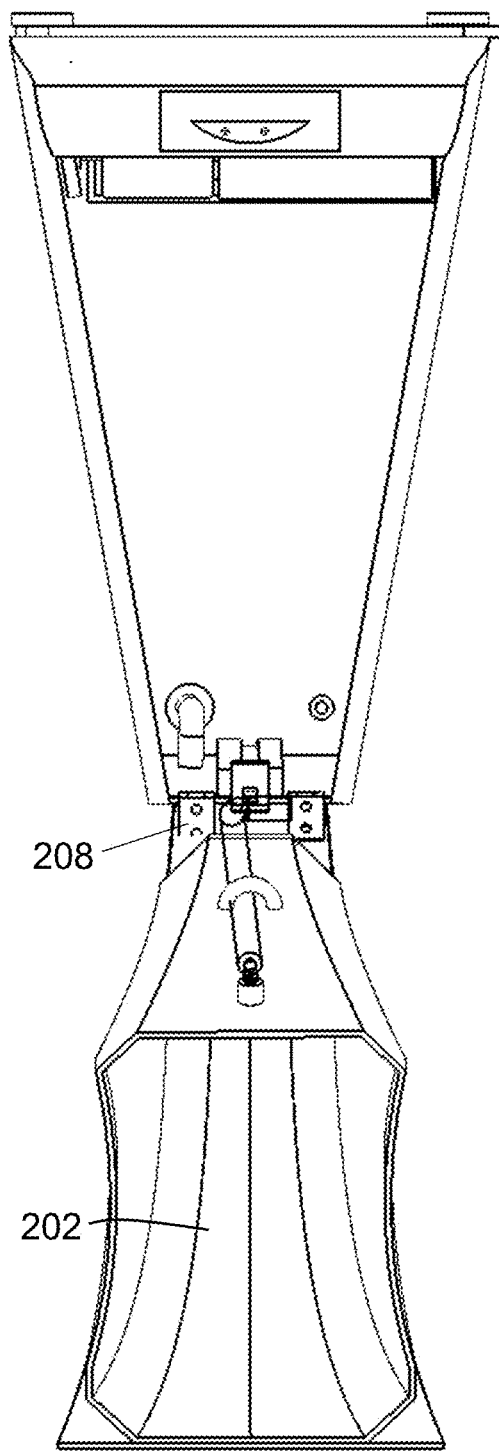
FIGS. 13A and 13B are drawings of a top and bottom views of an example urinal apparatus.
Figure 13B:
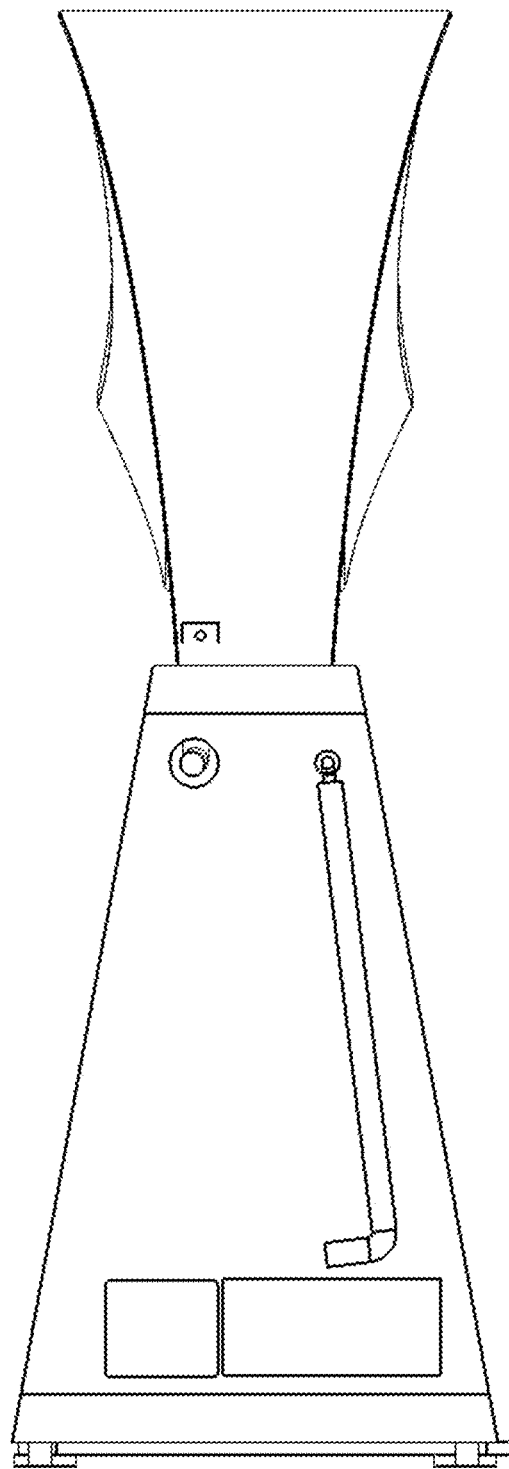

FIGS. 13A and 13B illustrate top and bottom view drawings, respectively, of example urinals. Shown in FIG. 13A is, among other things, example hinges 208. Also visible in FIGS. 13A and 13B are examples of the contours of the funnel 202. The contours of the funnel may be designed to reduce the amount of urinal splashing that may arise. The funnel may have angled faces as shown in FIG. 13A, may have ribbed elements, convex or concave elements, or other shapes intended to promote reduced splashing and streamlined draining. The dimensions of the funnel may be approximately four inches wide to approximately 24 inches wide depending on the circumstances and applications. Use of smaller width funnels may enable installation in more cramped areas.

Figure 14A:
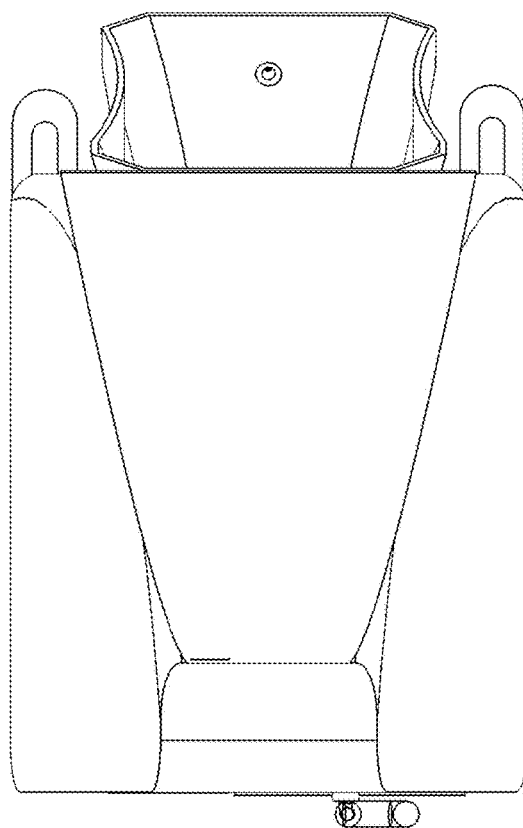
FIGS. 14A and 14B are drawings of a front and rear elevation views of an example urinal apparatus.
Figure 14B:
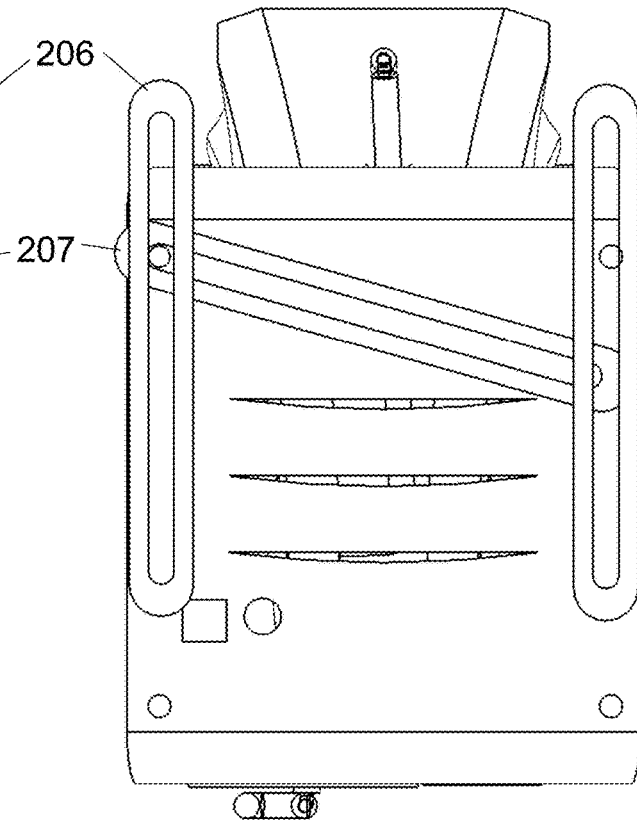

FIGS. 14A and 14B illustrate front and rear view drawings of example urinals. Shown in FIGS. 14A and 14B are, among other things, examples of brackets 206 and mount 207. As described, these components may be used to change the height or position of the urinal relative to the user and may be automated and controlled by controller 250 in association with motors or actuators that slide or move the mount 207 relative to the brackets 206.

Figure 15:
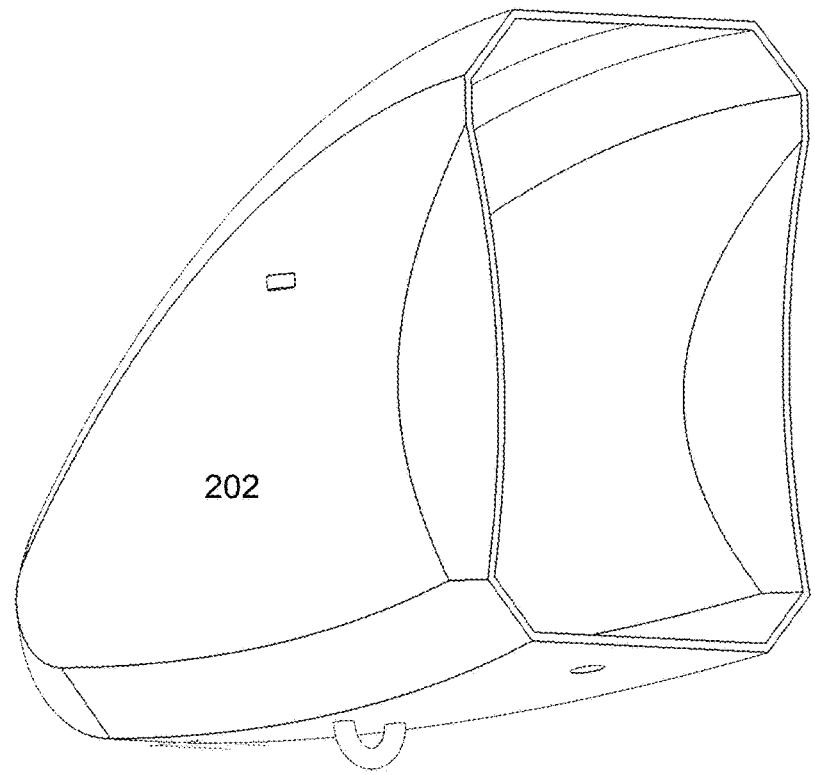
FIG. 15 is a drawing of an example a generally funnel shaped subsystem (with some convex and some concave portions) of an example urinal apparatus.

FIG. 15 illustrates another view of the funnel 202. The funnel 202 may be disposable, recyclable, or able to be periodically replaced. For example, the funnel may be fabricated from a material impregnated with odor fighting or cancelling chemicals such as air fresheners or perfumes. After a number of uses or period of time, or when the funnel generally smells less pleasant than it did when new or is showing staining, the user may replace the funnel with a new funnel. The funnel may be available in multiple different scents depending on the user's preference. The funnel 202 may also be non-ridged, for example, so that it can be opened or closed like an accordion. In such a situation, the urinal may be flush mounted or sealed within a wall of a bathroom. When a user approaches and is detected by one or more sensors, as discussed herein, the flush-mounted cover opens slowly revealing the funnel, like a sail unfurling on a sailboat. In such situation, the funnel may be fabricated from flexible materials such as rubber, plastic, cardboard (having a waterproof coating), or other material. Flexible materials may be used that enable the funnel to be depressed into a volume at least 25% smaller than its fully expanded volume, and collapsible to 75% or more smaller than its fully expanded volume.

The urinal may also be equipped with a near-field communication (NFC) mechanism 258 such as Bluetooth or RFID. In one example, a user has a cell phone equipped with NFC capabilities such as a Bluetooth transceiver. As the user approaches the urinal, the NFC hardware within the urinal system may detect the user's presence and may communicate signals to a controller 250 to open the urine receptacle. In addition, a control 250 may communicate signals to one or more motors or actuators 266 coupled to the brackets 206 and mount 207 and automatically position the height and left-right orientation of the urinal to a customized position for that particular user. A similar customized setting may be used by the user to set the position or angle of the funnel. The user may have preprogrammed the urinal by his prior use of the urinal, for example, as in a home environment by adjusting the orientation and location settings and then saving those settings to his personal profile within a memory of the urinal. Alternatively, the user may configure orientation and location settings for the urinal within a mobile application or online website or system, such that the toilet moves to a preferred height and opening even if the user has never previously used the toilet (e.g., as might be preferred in a commercial environment such as an airport) by: (1) recognizing the particular user is present near the urinal; (2) using an Internet connection to retrieve from a remote server the custom settings provided by the user; and (3) implementing the user's desired settings. The urinal system may read the users preferred settings from an Internet storage location via a wireless interface 262, such as WiFi or via a wired interface such as a LAN or Ethernet.

Figure 16:
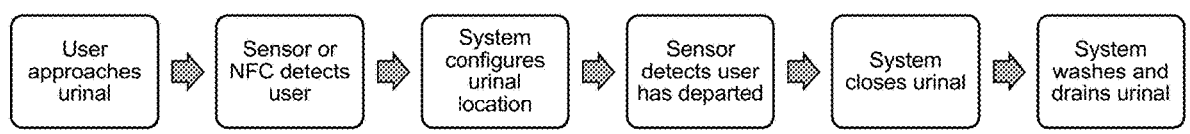
FIG. 16 is a box diagram of an example of the operation of a urinal apparatus.

FIG. 16 depicts an example of urinal operation. In this example, a user approaches a urinal and the urinal detects a user's presence, e.g., using NFC 258 or an infrared sensor. The urinal configures itself to receive urine, e.g., by moving from a closed position to an open position (the urinal might also modify its height or location). The user then uses the urinal. The urinal then determines that the user has departed, e.g., using NFC 258 or an infrared sensor. The urinal may have a timer to offset the amount of time the urinal waits to proceed after a user departs. The urinal may then move to a closed position. The system may then wash and drain itself. The washing may be done with the aid of air pressure or suction, and fragrance may be released within our outside of the urinal. When the next user approaches and is detected, the urinal opens again. If a subsequent user approaches before the urinal has fully closed, the urinal may reopen or may close and finish cleaning and provide a visual or audible message to the user that it is cleaning and will be ready for use momentarily. The urinal may also be controllable via remote control, e.g., by a bathroom attendant using an infrared or RF remote or by a remote technician sending operations to the urinal from a remote location. The urinal may also be controllable via voice control and voice recognition. For example, a user may approach a urinal and state "open," after which the urinal moves to a generally open position ready for use. Afterward, the user may state "close," after which the urinal moves to a generally closed position and begins a washing cycle. In such example, the urinal system includes a microphone coupled to an analog to digital converter together with a voice recognition algorithm to match detected sound signals to commands to be performed by controller 250.

The urinal may also be programmed with a timer to be opened or closed during different times of the day. For example, a user may program the urinal to be open during weekdays from 6 AM until 9 AM and then from 5 PM until 10 PM, and on weekends from 7 AM until 11 PM. In this example, the urinal is kept closed during the times that the user expects that it will not be in use and is left open during the times of likely or potential use.

Figures 17, 18:
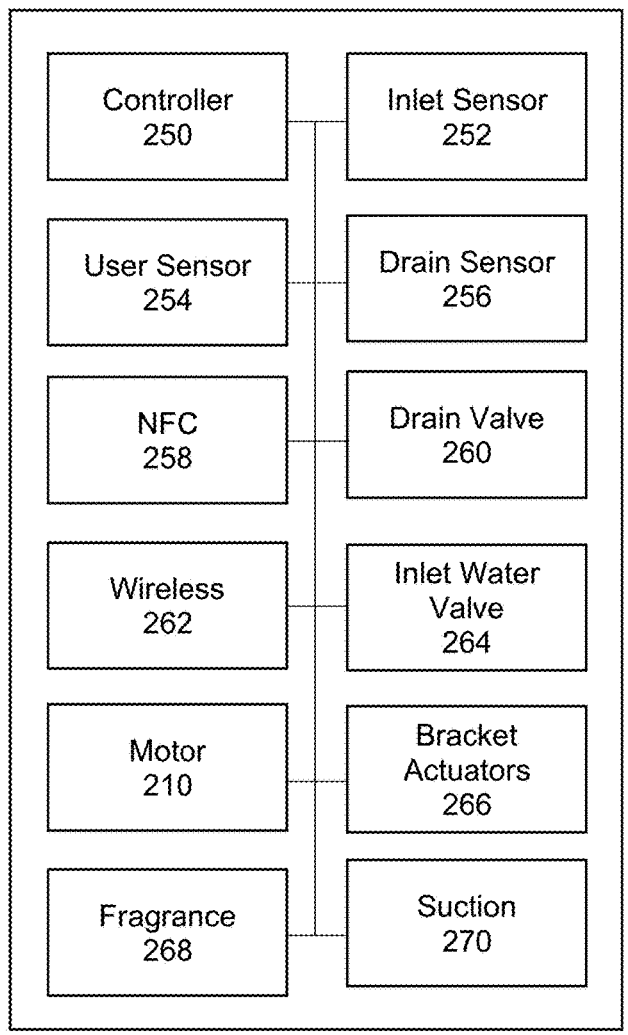
FIG. 17 is a box diagram of several components that may be included in the urinal apparatus to monitor or control the operation of the urinal system.
FIG. 18 is an example of a data item with example data fields relating to the monitoring, operation, and/or control of the urinal system.

FIG. 17 illustrates a block diagram of illustrative elements of an example urinal. Shown in FIG. 17 is a controller 250 programmable to control the operation of the urinal system including most if not all of the other elements shown in FIG. 17. There may be one or more inlet sensors 252 and drain sensors 256, as discussed herein operable to measure the flow of liquid into or out of the urinal system. Such measurements are usable to calculate the extent of use of the urinal, the busy time of day for the urinal, the environmental impact of the urinal, water use of the urinal, volume of urine received, among other things. The urinal may include a user sensor 254 used to detect the presence of a user, as discussed herein. NFC elements may be implemented to detect a user presence. NFC elements may also be used to charge money for use of the urinal. In public locations, urinals may be abused or misused. In another example, requiring a user account with an online system enables the urinal system to remain closed and free of dirt, debris, or vandalism by unpermitted users. In such example, only permitted users could be authorized to open the urinal for use. Such online systems may also be used to record user feedback relating to the urinal such as its cleanliness, its odor, a user review, or any other comments by a user. The urinal may communicate with the online system via the Internet using a wireless interface 262 within or near the urinal.

The controller 250 may also control the operation of a drain valve 260 or inlet water valve 264. The drain valve may be opened to permit urine to be drained from the urinal to a sewer or drain line. The inlet water valve 264 may be used to permit rinse water or other liquid to be dispensed into the funnel to clean and/or sanitize the urinal. The draining and rinsing may be done each time the urinal is used, or may be done less often or more often.

The controller 250 may also control the operation of motor 210 usable to open, close, or adjust the location of the funnel. The controller 250 may also control the operation of bracket actuators 266, as discussed herein. The controller 250 may also control the release of fragrance 268 within the urinal or in the vicinity of the urinal, and may also control the use of suction 270, such as a suction pump, used to remove odor, gas, and/or liquid from within the urinal. The ability to suction the funnel to aid cleanliness may be aided by the use of a seal between the edge of the funnel and the receptacle made from, for example, plastic, rubber, or neoprene.

FIG. 18 illustrates an example data item used in conjunction with an example urinal system. An example data item may have multiple data fields including fields for Toilet ID 272, Date/Time 274, User ID 276, Action 278, Inlet Sensor 280, Drain Sensor 282, Error Codes 284, and numerous other fields. The toilet ID field may assign a unique identifier to each toilet or urinal. The Toilet ID may therefore designate a particular urinal from among thousands of urinals under the administration of a given entity and may associate, for example, error codes with a particular urinal that needs to be serviced. Error codes 284 may be used to designate a urinal that is malfunctioning or that needs service, for example, unable to open or close properly, excessive inlet water flow or draining, sensor malfunction, out of fragrance, unauthorized user, among others. The date/time field 274 may be used to record the date and time of an Action 278 performed by the urinal, such as the date/time that the urinal opened or closed or was drained, rinsed, or washed. The Action field 278 may be used to encode actions taken by the toilet such as opening or closing, rinsing, sanitizing, draining, or various other actions the toilet may perform.

The urinal may have audible elements to be used by users that are sight impaired, such as beeps or synthesized or recorded voices. Such voices can provide a greeting to users. Sensors, such as infrared sensors, may be used in association with audible voice output to assist sight-impaired users to position their bodies in the appropriate location to use the urinal without needing to touch the urinal.

In the foregoing description, numerous examples and details are set forth to provide a clear understanding of various aspects of various inventions. It will be understood, however, by those skilled in the relevant arts, that the present inventions may be practiced without, or with various alternatives, modifications, and/or equivalents of various of these details. In other instances, structures and devices are omitted or shown or discussed more generally in order to avoid obscuring or unduly limiting the inventions. In many cases, a description of operations is sufficient to enable one to implement the various forms of the inventions. It should be noted that there are many different, alternative, or equivalent configurations, devices, and technologies to which the disclosed inventions may be applied. The full scope of the inventions is not limited to the examples that are described herein.

I claim:

1. A method of operating a touchless urinal comprising:
   a. detecting the nearby presence of a user using one or more touchless sensors including at least use of near field communication which is not infrared;
   b. based on the detection of a user, signaling one or more motors or one or more actuators to move at least a portion of the urinal into an angled position ready to receive urine;
   c. detecting the absence of the user using one or more touchless sensors;
   d. based on the detected absence of the user, signaling the one or more motors or one or more actuators to move at least a portion of the urinal into a closed position;
   e. spraying water through a water inlet to at least partially wash the interior of the urinal, wherein the water inlet is coupled to, and moves with, the portion of the urinal that is in the angled position.

2. The method of claim 1 further comprising opening a drain valve of the urinal to drain urine or water from the urinal.

3. The method of claim 1 wherein detecting the nearby presence of a user includes the use of RFID.

4. The method of claim 1 wherein detecting the nearby presence of a user includes the use of Bluetooth.

5. The method of claim 1 wherein the urinal is further to configured to transmit to a remote location via a wireless interface data relating to the operation or status of the urinal.

6. The method of claim 1 wherein the urinal uses suction to drain liquid from the urinal.

7. The method of claim 1 wherein the moveable portion of the urinal is substantially sealed from the release of air or liquid when in the closed position.

* * * * *